United States Patent
Wang et al.

(10) Patent No.: US 10,007,140 B2
(45) Date of Patent: Jun. 26, 2018

(54) SUBSTRATE, DISPLAY PANEL AND DISPLAY APPARATUS HAVING THE SAME, AND FABRICATING METHOD THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Junwei Wang, Beijing (CN); Zhixiao Yao, Beijing (CN); Jianguo Xing, Beijing (CN); Xiaopeng Cui, Beijing (CN); Weitao Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 152 days.

(21) Appl. No.: 15/036,932

(22) PCT Filed: Dec. 10, 2015

(86) PCT No.: PCT/CN2015/096945
§ 371 (c)(1),
(2) Date: May 16, 2016

(87) PCT Pub. No.: WO2016/188087
PCT Pub. Date: Jan. 12, 2016

(65) Prior Publication Data
US 2017/0123265 A1    May 4, 2017

(30) Foreign Application Priority Data
May 22, 2015    (CN) .......................... 2015 1 0266787

(51) Int. Cl.
*G02B 26/00*    (2006.01)
*G02F 1/1335*   (2006.01)
(Continued)

(52) U.S. Cl.
CPC ...... *G02F 1/133512* (2013.01); *G02F 1/1339* (2013.01); *G02F 1/133377* (2013.01);
(Continued)

(58) Field of Classification Search
CPC .. G02F 1/133512; G02F 1/1339; G02F 1/167; G02F 1/133514; G02F 1/134309; G02F 1/133377
See application file for complete search history.

(56) References Cited

U.S. PATENT DOCUMENTS

2012/0154344 A1*    6/2012    Peng ..................... G02B 5/201
                                                            345/204

FOREIGN PATENT DOCUMENTS

CN    102540555 A   *   7/2012   ........... G02F 1/1335
CN    102540555 A       7/2012
(Continued)

OTHER PUBLICATIONS

International Search Report & Written Opinion dated Mar. 8, 2016 regarding PCT/CN2015/096945.

*Primary Examiner* — Joseph P Martinez
(74) *Attorney, Agent, or Firm* — Intellectual Valley Law, P.C.

(57) ABSTRACT

The present application discloses a substrate comprising a base substrate; a black matrix layer comprising an array of a plurality of black matrixes on a first side of the base substrate; and a plurality of electrophoresis cells on the first side of the base substrate. Each of the plurality of electrophoresis cells comprises a first electrode, a second electrode, a mixture of an electrophoresis media and charged particle. The charged particles are movable in response to an electrical signal.

20 Claims, 7 Drawing Sheets

(51) Int. Cl.
*G02F 1/167* (2006.01)
*G02F 1/1343* (2006.01)
*G02F 1/1333* (2006.01)
*G02F 1/1339* (2006.01)

(52) U.S. Cl.
CPC .. *G02F 1/133514* (2013.01); *G02F 1/134309* (2013.01); *G02F 1/167* (2013.01); *G02F 2001/133357* (2013.01); *G02F 2001/134345* (2013.01); *G02F 2001/1676* (2013.01); *G02F 2001/1678* (2013.01); *G02F 2201/50* (2013.01)

(56) References Cited

FOREIGN PATENT DOCUMENTS

| | | | | |
|---|---|---|---|---|
| CN | 103246106 A | 8/2013 | | |
| CN | 104241327 A | 12/2014 | | |
| CN | 104808384 A | * 7/2015 | ........... | G02F 1/1343 |
| CN | 104808384 A | 7/2015 | | |
| JP | 2003280044 A | 10/2003 | | |

* cited by examiner

```
Forming the black matrix layer comprising the plurality of black matrixes on the base
substrate.
                                      ↓
Forming an array of a plurality of first electrodes and an array of a plurality of second
electrodes on the base substrate.
                                      ↓
Forming an array of walls defining the plurality of electrophoresis cells, each of
which comprising one of the plurality of first electrodes and one of the plurality of
second electrodes.
                                      ↓
Dispensing the charged particle and the electrophoresis media in each of the plurality
of electrophoresis cells.
                                      ↓
Forming a planar layer on a side distal to the base substrate of the black matrix layer
and the plurality of electrophoresis cells, sealing the plurality of electrophoresis cells.
```

SUBSTRATE, DISPLAY PANEL AND DISPLAY APPARATUS HAVING THE SAME, AND FABRICATING METHOD THEREOF

CROSS-REFERENCE TO RELATED APPLICATION

This application is a national stage application under 35 U.S.C. § 371 of International Application No. PCT/CN2015/096945 filed Dec. 10, 2015, which claims priority to Chinese Patent Application No. 201510266787.0, filed May 22, 2015, the contents of which are incorporated by reference in the entirety.

FIELD

The present invention relates to display technology, more particularly, to a substrate, a display panel and a display apparatus having the same, and a fabricating method thereof.

BACKGROUND

Commercially available display panels such as liquid crystal display panels and organic light emitting display panels typically have light leakage problems. The problems become more severe for flexible display panels or display panels which are convertible between a flat display mode and a curved display mode. Common techniques for improving light leakage problem include usage of a wider black matrix. However, these techniques reduce aperture ration of the display panel.

SUMMARY

In one aspect, it provides a substrate comprising a base substrate; a black matrix layer comprising an array of a plurality of black matrixes on a first side of the base substrate; and a plurality of electrophoresis cells on the first side of the base substrate, each of the plurality of electrophoresis cells comprises a first electrode, a second electrode, a mixture of an electrophoresis media and charged particles, wherein the charged particles are movable in response to an electrical signal.

Optionally, the first electrode and the second electrode are planar electrodes; the principal planes of which are substantially perpendicular to that of the one of the plurality of black matrixes.

Optionally, the first electrode and the second electrode are planar electrodes; the principal planes of which are substantially parallel to that of the one of the plurality of black matrixes.

Optionally, a projection of the first electrode on the base substrate is at least partially within a projection of one of the plurality of black matrixes on the base substrate; and a projection of the second electrode on the base substrate is at least partially outside of the projection of the one of the plurality of black matrixes on the base substrate.

Optionally, the projection of the first electrode on the base substrate is within the projection of the one of the plurality of black matrixes on the base substrate, and the projection of the second electrode on the base substrate is outside the projection of the one of the plurality of black matrixes on the base substrate.

Optionally, the second electrode is on only one side of the one of the plurality of black matrixes, the projection of the second electrode on the base substrate is at least partially outside of the projection of the one of the plurality of black matrixes on the base substrate.

Optionally, the second electrode comprises a first sub-electrode and a second sub-electrode, the first sub-electrode is on a first side of the one of the plurality of black matrixes, the second sub-electrode is on a second side of the one of the plurality of black matrixes, the projection of the first sub-electrode on the base substrate is at least partially outside of the projection of the one of the plurality of black matrixes on the base substrate, and the projection of the second sub-electrode on the base substrate is at least partially outside of the projection of the one of the plurality of black matrixes on the base substrate.

Optionally, a projection of the first electrode on the base substrate is at least partially outside of a projection of one of the plurality of black matrixes on the base substrate, a projection of the second electrode on the base substrate is at least partially outside of the projection of the one of the plurality of black matrixes on the base substrate, the first electrode is on a first side of the one of the plurality of black matrixes, and the second electrode is on a second side of the one of the plurality of black matrixes.

Optionally, the projection of the first electrode on the base substrate is outside of the projection of the one of the plurality of black matrixes on the base substrate, the projection of the second electrode on the base substrate is outside of the projection of the one of the plurality of black matrixes on the base substrate.

Optionally, the first electrode and the second electrode are planar electrodes; the principal planes of which are substantially parallel to that of the one of the plurality of black matrixes.

Optionally, the first electrode and the second electrode are planar electrodes; the principal planes of which are substantially perpendicular to that of the one of the plurality of black matrixes.

Optionally, the charged particle migrates toward and accumulates around the first electrode in response to a first electrical signal, and migrates toward and accumulates around the second electrode in response to a second electrical signal.

Optionally, the first electrical signal is a first voltage difference between the first electrode and the second electrode, and the second electrical signal is a second voltage difference between the first electrode and the second electrode.

Optionally, the charged particle is a non-transparent charged particle, and the electrophoresis media is transparent; the total light shielding area of the substrate is increased in response to the second electrical signal.

Optionally, the charged particle is a transparent charged particle, and the electrophoresis media is non-transparent; the total light shielding area of the substrate is increased in response to the first electrical signal.

Optionally, the charged particle is a solution immiscible with the electrophoresis media.

Optionally, the second electrode is a transparent electrode.

Optionally, the first electrode is connected to ground via a first signal line and the second electrode is connected to a second signal line for receiving a positive voltage signal or a negative voltage signal.

Optionally, the substrate further comprises a color film layer comprising an array of color sub-pixels on the first side of the base substrate.

Optionally, a projection of the first electrode on the base substrate is at least partially within a projection of one of the plurality of black matrixes on the base substrate; and a projection of the second electrode is at least partially within a projection of one of the plurality of color sub-pixels on the base substrate.

Optionally, the projection of the second electrode on the base substrate is within the projection of the one of the plurality of color sub-pixels on the base substrate.

Optionally, one of the plurality of black matrixes is proximal to a first color sub-pixel on a first side of the one of the plurality of black matrixes and a second color sub-pixel on a second side of the one of the plurality of black matrixes, a projection of a first one of the plurality of electrophoresis cells is substantially within a projection of the first color sub-pixel on the base substrate, the first one of the plurality of electrophoresis cells comprises the first electrode and the second electrode.

Optionally, the first electrode and the second electrode are planar electrodes; the principal planes of which are substantially perpendicular to that of the first color sub-pixel.

Optionally, the first electrode and the second electrode are planar electrodes; the principal planes of which are substantially parallel to that of the first color sub-pixel.

Optionally, the one of the plurality of black matrixes overlaps with the first color sub-pixel over a first width on the first side and overlaps with the second color sub-pixel over a second width on the second side, the second width is larger than the first width.

Optionally, a projection of a second one of the plurality of electrophoresis cells is substantially within a projection of the second color sub-pixel on the base substrate, the second one of the plurality of electrophoresis cells comprises the third electrode and the fourth electrode.

Optionally, the third electrode and the fourth electrode are planar electrodes; the principal planes of which are substantially perpendicular to that of the second color sub-pixel.

Optionally, the substrate further comprises a planar layer on a side distal to the base substrate of the black matrix layer, the color film layer, and the plurality of electrophoresis cells, sealing the plurality of electrophoresis cells.

Optionally, the first electrode, the second electrode, the third electrode, and the fourth electrode are planar electrodes; the principal planes of which are substantially parallel to that of the planar layer.

Optionally, the first electrode is on a surface of the first color sub-pixel distal to the base substrate, and the third electrode is on a surface of the second color sub-pixel distal to the base substrate.

Optionally, the second electrode and the fourth electrode are on a surface of the planar layer proximal to the base substrate.

Optionally, the substrate further comprises a protective layer on a side distal to the base substrate of the black matrix layer and the color film layer.

Optionally, the plurality of electrophoresis cells are on a side of the protective layer distal to the base substrate.

Optionally, the first electrode and the second electrode are substantially on a same plane with respect to each other.

Optionally, the substrate further comprises a planar layer on a side distal to the base substrate of the black matrix layer, the color film layer, and the plurality of electrophoresis cells, sealing the plurality of electrophoresis cells.

Optionally, a projection of the first electrode on the base substrate is at least partially within a projection of one of the plurality of black matrixes on the base substrate; a projection of the second electrode on the base substrate is at least partially outside of the projection of the one of the plurality of black matrixes on the base substrate; and the first electrode is on a surface of the planar layer proximal to the base substrate.

Optionally, the substrate further comprises a transparent electrode layer on a side of the planar layer distal to the base substrate; wherein the transparent electrode layer is connected to ground.

Optionally, the substrate further comprises a shielding electrode layer on a side of the planar layer distal to the base substrate, the shielding electrode layer is connected to ground.

Optionally, the shielding electrode layer is a transparent conductive layer, the shielding electrode layer is on a side of the planar layer distal to the substrate.

Optionally, the shielding electrode layer is a metal layer, the shielding electrode layer is on a side of the planar layer distal to the base substrate in areas corresponding to the black matrix layer.

Optionally, the substrate further comprises a transparent high resistivity layer on a side of the shielding electrode layer distal to the base substrate.

Optionally, the substrate further comprises a deformation detecting layer disposed on a second side of the substrate.

Optionally, the deformation detecting layer comprises a first transparent electrode layer, a second transparent electrode layer, and a polymer layer containing ionic groups, the polymer layer generates a deformation voltage signal when the polymer layer is pressed, the first transparent electrode layer and the second transparent electrode layer transmit the deformation voltage signal to an external circuit.

In another aspect, it also provides a method of fabricating a substrate described herein, comprising forming the black matrix layer comprising the plurality of black matrixes on the base substrate; forming an array of a plurality of first electrodes and an array of a plurality of second electrodes on the base substrate; forming an array of walls defining the plurality of electrophoresis cells, each of which comprising one of the plurality of first electrodes and one of the plurality of second electrodes; dispensing the charged particle and the electrophoresis media in each of the plurality of electrophoresis cells; and forming a planar layer on a side distal to the base substrate of the black matrix layer and the plurality of electrophoresis cells, sealing the plurality of electrophoresis cells.

Optionally, the step of forming the planar layer comprises forming a first planar layer having a higher density on the base substrate; curing the first planar layer by light; forming a second planar layer having a lower density on the base substrate; and curing the second planar layer by heat.

In another aspect, it also provides a display panel comprising a substrate described herein, and an array substrate.

In another aspect, it also provides a display panel comprising a substrate manufactured by a method described herein, and an array substrate.

In another aspect, it further provides a display apparatus comprising a display panel described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Figure 1A:
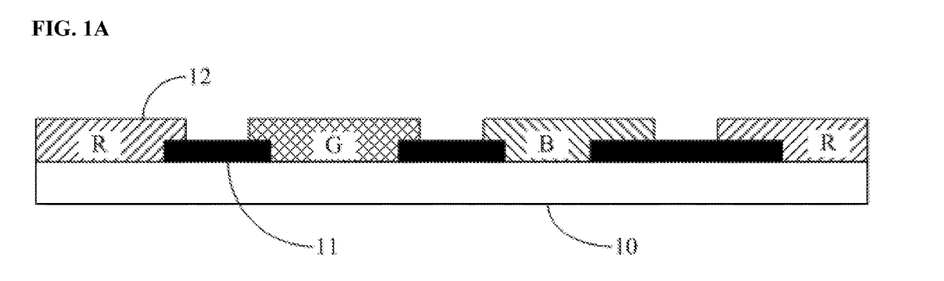
FIGS. 1A and 1B are cross-sectional views of the structures of two conventional substrates.
Figure 1B:
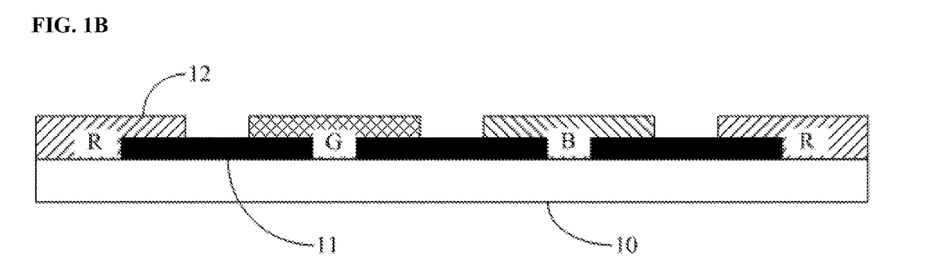

FIGS. 1A and 1B are cross-sectional views of the structures of two conventional substrates (e.g., color filter substrates). Referring to FIGS. 1A and 1B, the conventional color filter substrates include a base substrate 10, a black matrix 11 and a color filter film 12 on the base substrate 10. The color filter film 12 includes a pixel unit comprising red (R) sub-pixels, green (G) sub-pixels, and blue (B) sub-pixels.

FIG. 1A is a cross-sectional view of a substrate having a black matrix 11 with a non-uniform width pattern. As shown in FIG. 1A, the black matrix width between the B sub-pixel and the R sub-pixel is larger than the black matrix width between the R sub-pixel and the G sub-pixel, the latter being the same as the black matrix width between the G sub-pixel and the B sub-pixel. When certain areas of the substrate are prone to light leakage, the substrate can be specifically designed to have a wider black matrix in those areas. For example, when the area between the B sub-pixel and the R sub-pixel is known to be susceptible to light leakage (e.g., due to the underlying electrode structure on the array substrate), the black matrix width corresponding to that area can be designed to be wider than those of other black matrixes.

FIG. 1B is a cross-sectional view of a substrate having a black matrix 11 with a uniformly wider width pattern. As shown in FIG. 1B, the black matrix widths between the B sub-pixel and the R sub-pixel, between the R sub-pixel and the G sub-pixel, and between the G sub-pixel and the B sub-pixel are all the same. The uniform black matrix width in FIG. 1B is larger than the black matrix width between the B sub-pixel and the R sub-pixel in FIG. 1A. The aperture ratio of a display panel having a uniformly wider black matrix width pattern, however, is significantly reduced.

In making a curved or flexible display panel (e.g., a liquid crystal display panel), typically the display panel is bent to obtain a predetermined curvature. The bending of the display panel results in a distortion, e.g., a positional shift of the array substrate relative to the substrate. The distortion results in light leakage along the edges of the pixels. The issue is particularly problematic for large screen display panels or display panels having a wider view angle.

Figure 2:
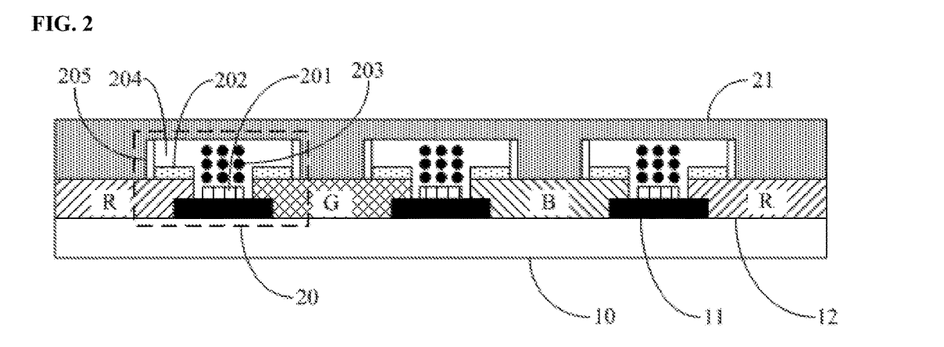
FIG. 2 is a cross-sectional view of a substrate in some embodiments.

FIG. 2 is a cross-sectional view of a substrate in an embodiment. Although FIG. 2 uses a liquid crystal display panel as the illustrative example, the display panels and substrates disclosed herein can be any suitable types of display panels or substrates, including liquid crystal display panels, organic light emitting display panels (e.g., AMOLED), and substrates thereof. A liquid crystal display panel and a "white" RGB organic light emitting display panel require a color filter. A substrate having a color filter sometimes refers to a color filter substrate.

Referring to FIG. 2, the exemplary substrate in the embodiment is a color filter substrate in a liquid crystal display panel. As discussed above, the present disclosure is not limited to liquid crystal display panels or color filter substrates, but can be any suitable types of display panels and substrates. The substrate in the embodiment includes a base substrate 10 and a black matrix 11 on the base substrate 10. Because the display panel in the embodiment is a liquid crystal display panel, the substrate further includes a color film layer 12 having an array of color sub-pixels. The substrate in the embodiment further includes a plurality of electrophoresis cells 20 and a planar layer 21. The electrophoresis cell 20 in the embodiment includes a first electrode 201, a second electrode 202, a mixture of an electrophoresis media 204 and charged particles 203. The charged particles are movable in response to an electrical signal.

As used herein, the term "particle" refers to any substance capable of migrating in an electrophoresis media under the influence of an electric field. Thus, the particle includes substances of any suitable sizes. For example, a particle can be an object such as a bead, a microsphere, a vesicle, an emulsion. A particle can also be a large molecule or a small molecule. Examples of particles include charged dye molecules, charged macromolecules, and charged small molecules.

Referring to FIG. 2, each of the plurality of electrophoresis cells 20 is defined by a wall 205 within an electrophoresis region. The electrophoresis region includes a first region and a second region. The first electrode 201 is disposed in the first region, and the second electrode 202 is disposed in the second region. As shown in FIG. 2, a projection of the first electrode 201 on the base substrate 10 is at least partially within a projection of one of the plurality of black matrixes 11 on the base substrate 10; and a projection of the second electrode 202 on the base substrate 10 is at least partially outside of the projection of the one of the plurality of black matrixes 11 on the base substrate 10. In some embodiments, the projection of the first electrode 201 on the base substrate 10 is within the projection of the one of the plurality of black matrixes 11 on the base substrate 10, and the projection of the second electrode 202 on the base substrate 10 is outside the projection of the one of the plurality of black matrixes 11 on the base substrate 10.

Referring to FIG. 2, under the influence of an electric field, the charged particle 203 migrates toward and accumulates around either the first electrode 201 or the second electrode 202, depending on the type and direction of the applied electric field. For example, the charged particle 203 may migrate toward and accumulate around the first electrode 201 in response to a first electrical signal (e.g., a first voltage difference between the first electrode 201 and the second electrode 202), and may migrate toward and accumulate around the second electrode 202 in response to a second electrical signal (e.g., a second voltage difference between the first electrode 201 and the second electrode 202). In some embodiments, the migration of the charged particles 203 results in a change in the total light shielding area of the substrate in response to electrical signals applied to the first and second electrodes. In some embodiments, the migration of the charge particles 203 results in a positional shift of the light shielding area in the substrate in response to electrical signals applied to the first and second electrodes. Optionally, the migration of the charge particles 203 results in both a positional shift and a change in the total light shielding area of the substrate. Optionally, the migration of the charge particles 203 results in only a positional shift but not a change in the total light shielding area of the substrate.

In some embodiments, the electrophoresis cell 20 includes a non-transparent charged particle 203 and a transparent electrophoresis media 204, as shown in FIG. 2. The non-transparent charged particle 203 migrates toward and accumulates around the first electrode 201 in response to a first electrical signal (e.g., a first voltage difference between the first electrode 201 and the second electrode 202), and migrates toward and accumulates around the second electrode 202 in response to a second electrical signal (e.g., a second voltage difference between the first electrode 201 and the second electrode 202). Because the charged particle 203 is non-transparent, the movement of the charged particle 203 from the first electrode 201 to the second electrode 202 changes the total light shielding area of the substrate, i.e., the total light shielding area of the substrate is increased in response to the second electrical signal.

In some embodiments, the electrophoresis cell 20 includes a transparent charged particle 203 and a non-transparent electrophoresis media 204. The transparent charged particle 203 migrates toward and accumulates around the first electrode 201 in response to a first electrical signal (e.g., a first voltage difference between the first electrode 201 and the second electrode 202), and migrates toward and accumulates around the second electrode 202 in response to a second electrical signal (e.g., a second voltage difference between the first electrode 201 and the second electrode 202). As the charge particle 203 migrates from the second electrode 202 to the first electrode 201, it displaces the non-transparent electrophoresis media 204 in the first region. As a result, the non-transparent electrophoresis media 204 is pushed into and occupies a region surrounding the second electrode 202. Because the charged particle 203 is transparent and the electrophoresis media 204 is non-transparent, the movement of the charged particle 203 from the second electrode 202 to the first electrode 201 changes the total light shielding area of the substrate. The total light shielding area of the substrate is thus increased in response to the first electrical signal.

In some embodiments, the charged particle 203 is positively charged. In some embodiments, the charged particle 203 is negatively charged.

In some embodiments, the charged particle 203 is in a form of a solution immiscible with the electrophoresis media 204. The charged solution contains the charged particle 203.

In some embodiments, the second electrode 202 is a transparent electrode. Optionally, the first electrode 201 is a non-transparent electrode, and the second electrode 202 is a transparent electrode. Optionally, both the first electrode 201 and the second electrode 202 are transparent electrodes.

In some embodiments, the first electrode 201 is connected to ground via a first signal line and the second electrode 202 is connected to a second signal line for receiving a positive voltage signal or a negative voltage signal.

In some embodiments, a projection of the first electrode 201 on the base substrate 10 is at least partially within a projection of a black matrix 11 on the base substrate 10; and a projection of the second electrode 202 on the base substrate 10 is at least partially outside of the projection of the same black matrix 11 on the base substrate 10, wherein the black matrix 11 is associated with (e.g., proximal to or underneath) the electrophoresis unit 20 having the first electrode 201 and the second electrode 202. Optionally, the projection of the first electrode 201 on the base substrate 10 is within the projection of the black matrix 11 on the base substrate 10. Optionally, the projection of the second electrode 202 on the base substrate 10 is outside the projection of the black matrix 11 on the base substrate 10. Optionally, the projection of the first electrode 201 on the base substrate 10 is within the projection of the black matrix 11 on the base substrate 10, and the projection of the second electrode 202 on the base substrate 10 is outside the projection of the black matrix 11 on the base substrate 10. Optionally, the projection of the first electrode 201 on the base substrate 10 has a first portion within the projection of the black matrix 11 on the base substrate 10, and a second portion outside the projection of the black matrix 11 on the base substrate 10. Optionally, the projection of the second electrode 202 on the base substrate 10 has a first portion outside the projection of the black matrix 11 on the base substrate 10, and a second portion within the projection of the black matrix 11 on the base substrate 10.

In some embodiments, the substrate further includes a color film layer 12 having an array of color sub-pixels (FIG. 2). Optionally, a projection of the first electrode 201 on the base substrate 10 is at least partially within a projection of a black matrix 11 on the base substrate 10; and, and a projection of the second electrode 202 is at least partially within a projection of the color sub-pixel on the base substrate 10, wherein the black matrix 11 and the color sub-pixel are associated with (e.g., proximal to or underneath) the electrophoresis unit 20 having the first electrode 201 and the second electrode 202. Optionally, the projection of the second electrode 202 on the base substrate 10 is within the projection of the color sub-pixel on the base substrate 10. Optionally, the projection of the first electrode 201 on the base substrate 10 is within the projection of the black matrix 11 on the base substrate 10. Optionally, the projection of the second electrode 202 on the base substrate 10 is within the projection of the color sub-pixel on the base substrate 10, and the projection of the first electrode 201 on the base substrate 10 is within the projection of the black matrix 11 on the base substrate 10. Optionally, the projection of the second electrode 202 has a first portion within the projection of the color sub-pixel on the base substrate 10, and a second portion within the projection of the black matrix 11 on the base substrate 10 (FIG. 2). Optionally, the projection of the first electrode 201 on the base substrate 10 has a first portion within the projection of the black matrix 11 on the base substrate 10, and a second portion within the projection of the color sub-pixel on the base substrate 10.

Referring to FIG. 2, the substrate in the embodiment further includes a planar layer 21. The planar layer 21 is on a side distal to the base substrate of the black matrix layer 11, the color film layer 12, and the plurality of electrophoresis cells 20, sealing or packing the plurality of electrophoresis cells 20. Because the black matrix layer 11 and the color film layer 12 are typically made of stable material such as resins, the electrophoresis cells 20 on the black matrix layer 11 and the color film layer 12 usually would not affect the functions of black matrix layer 11 and the color film layer 12.

Referring to FIG. 2, each of the plurality of electrophoresis cells 20 is defined by a wall 205 within an electrophoresis region. The wall 205 can be made of a transparent material. Optionally, the wall 205 is made of a same material as the planar layer 21.

The base substrate can be made of any suitable material, for example, glass. In some embodiments, the thickness of the black matrix 11 is about 1.2 micrometer. Optionally, the thickness of the color film layer 12 is about 2.3 micrometer. Optionally, the thickness of the wall 205 is about 1 micrometer. Optionally, the thickness of the planar layer 21 is about 1.5 micrometer. Optionally, the electrophoresis media 204 is encapsulated within the sealed space formed by the walls 205 and the planar layer 21. Optionally, the diameter of the charged particle 203 is about 0.1 micrometer. Optionally, the density of the charged particle is more than ⅔. Optionally, the charged particle 203 is a negatively charged metal-chelated black-20 particle. Optionally, the electrophoresis media 204 is ethanol or 2-ethoxy ethanol.

In some embodiments, the first electrode 201 is disposed in the first region, and the second electrode 202 is disposed in the second region. Optionally, the first electrode 201 is disposed in an area corresponding to the black matrix 11 between two neighboring color sub-pixels. Optionally, the second electrode 202 is disposed in an area corresponding to two neighboring color sub-pixels. Optionally, the second electrode 202 is disposed in an area corresponding to only one of the two neighboring color sub-pixels. Optionally, the second region at least partially overlaps with an area corresponding to the color sub-pixels. Optionally, the second region is the area corresponding to the second electrode 202.

Referring to FIG. 2, the first electrode 201 is disposed in the first region corresponding to the black matrix 11 between two neighboring color sub-pixels, the second electrode 202 is disposed in the second region corresponding to two neighboring color sub-pixels. The second electrode 202 is symmetrically distributed within the second region. The first electrodes 201 have a substantially uniform size and shape. The second electrodes 202 have a substantially uniform size and shape. Optionally, the first electrodes 201 have non-uniform sizes and shapes. Optionally, the second electrode 202 have non-uniform sizes and shapes.

Figure 13:
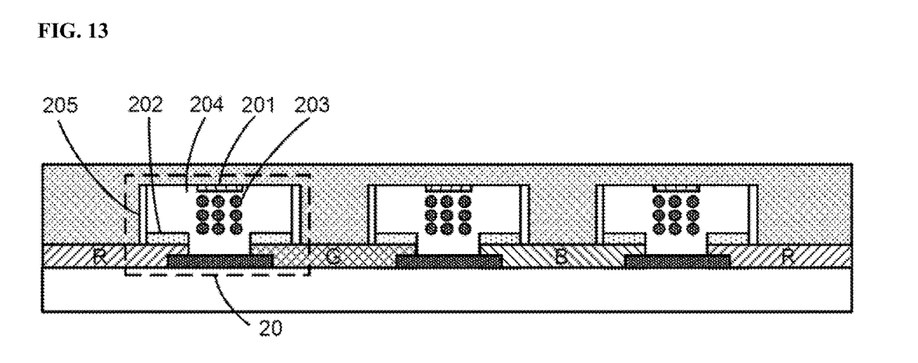
FIG. 13 is a cross-sectional view of a substrate in some embodiments.

Numerous alternative embodiments can be practiced. For example, the first electrode 201 and/or the second electrode 202 can be on the surface of the black matrix 11. In some embodiments, the second electrode 202 and/or the first electrode 201 can be on the surface of the color sub-pixel. In some embodiments, the first electrode 201 (or the second electrode 202, or both) is on the surface of the planar layer 21 proximal to the base substrate 10. For example, FIG. 13 shows a cross-sectional view of a substrate in some embodiments. As shown in FIG. 13, the first electrode 201 is on the surface of the planar layer 21 proximal to the base substrate, and two second electrodes 202 are on the surface of the color sub-pixels.

In some embodiments, the first electrode 201 and the second electrode 202 are planar electrodes. Optionally, the principal planes of the first electrode 201 and/or the second electrode 202 are substantially parallel to that of the one of the plurality of black matrixes 11 (see, e.g., FIGS. 2-5). Optionally, the principal planes of the first electrode 201 and/or the second electrode 202 are substantially perpendicular to that of the one of the plurality of black matrixes 11 (see, e.g., FIGS. 11, 14 and 15).

Figure 11:
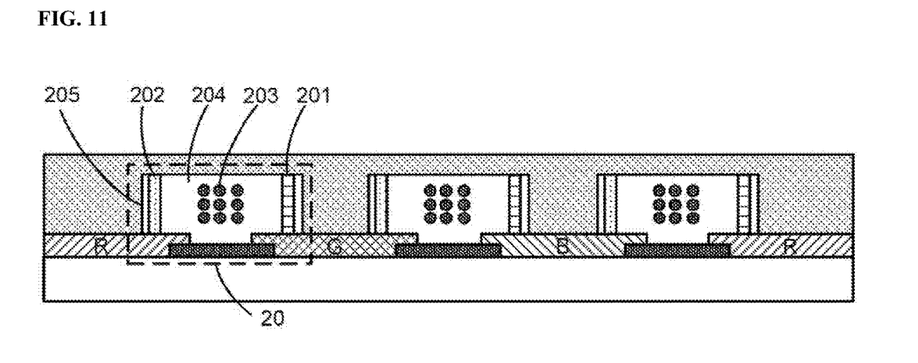
FIG. 11 is a cross-sectional view of a substrate in some embodiments.
Figure 12:
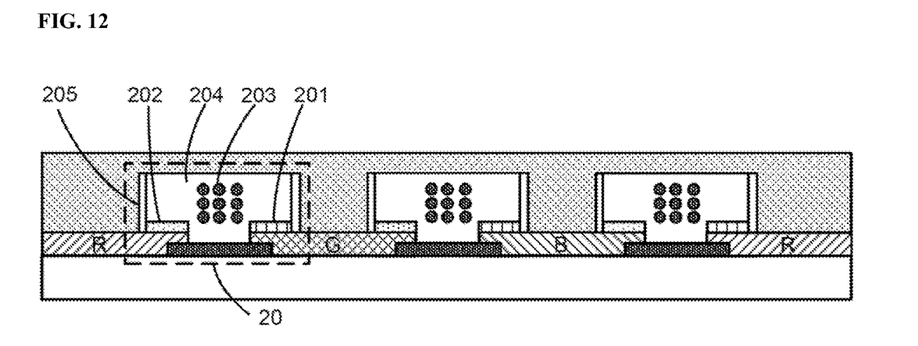
FIG. 12 is a cross-sectional view of a substrate in some embodiments.

In some embodiments, a projection of the first electrode 201 on the base substrate 10 is at least partially outside of a projection of a black matrix 11 on the base substrate 10, and a projection of the second electrode 202 on the base substrate 10 is at least partially outside of the projection of the black matrixes 11 on the base substrate 10, wherein the black matrix 11 is associated with (e.g., proximal to or underneath) the electrophoresis unit 20 having the first electrode 201 and the second electrode 202 (see, e.g., FIGS. 11-12). Optionally, the first electrode 201 is on a first side of the one of the plurality of black matrixes 11, and the second electrode 202 is on a second side of the one of the plurality of black matrixes 11. Optionally, the projection of the first electrode 201 on the base substrate 10 is outside of the projection of the one of the plurality of black matrixes 11 on the base substrate 10, the projection of the second electrode 202 on the base substrate 10 is outside of the projection of the one of the plurality of black matrixes 11 on the base substrate 10 (FIG. 11). For example, the first electrode 201 and the second electrode 201 can be on two color sub-pixels neighboring the electrophoresis unit 20, and are both outside the region corresponding to the black matrix 11 (FIG. 11). As discussed above, optionally, the principal planes of the first electrode 201 and/or the second electrode 202 can be substantially perpendicular to that of the one of the plurality of black matrixes 11 (FIG. 11). Optionally, the principal planes of the first electrode 201 and/or the second electrode 202 are substantially parallel to that of the one of the plurality of black matrixes 11 (FIG. 12).

In some embodiments, a projection of the electrophoresis cell 20 is partially within and partially outside of a projection of the black matrix 11 on the base substrate 10. Optionally, the projection of the electrophoresis cell 20 is outside of the projection of the black matrix 11 on the base substrate 10 on both sides of the black matrix 11. Optionally, the projection of the electrophoresis cell 20 is outside of the projection of the black matrix 11 on the base substrate 10 on only one side of the black matrix 11.

In some embodiments, the substrate includes a first electrophoresis cell 20 proximal to a first side of the black matrix 11. A projection of the first electrophoresis cell 20 is substantially outside of a projection of the black matrix 11 on the base substrate 10. The first electrophoresis cell 20 includes a first electrode 201 and the second electrode 202.

In some embodiments, the substrate further includes a second electrophoresis cell proximal to the second side of the black matrix 11. A projection of the second electrophoresis cell is substantially outside of a projection of the black matrix 11 on the base substrate 10. The second electrophoresis cell includes the third electrode and the fourth electrode.

In some embodiments, the black matrix 11 is proximal to a first color sub-pixel on a first side of the black matrix 11 and a second color sub-pixel on a second side of the black matrix 11. The substrate includes a first electrophoresis cell 20. A projection of the first electrophoresis cell 20 is substantially within a projection of the first color sub-pixel on the base substrate 10. The first electrophoresis cell 20 includes the first electrode 201 and the second electrode 202 (FIGS. 14-16).

Figure 14:
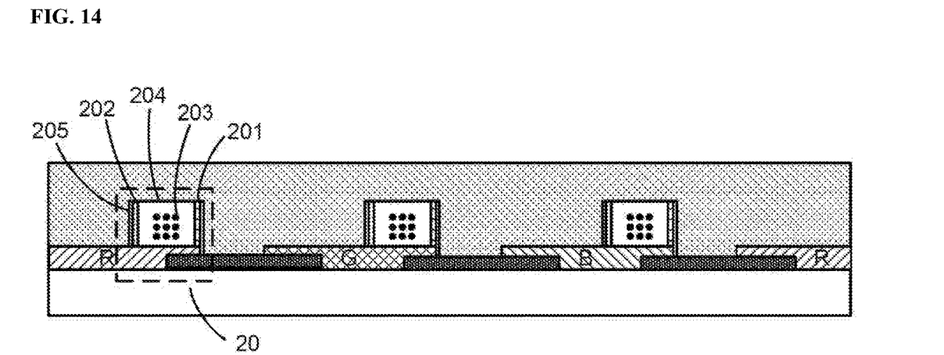
FIG. 14 is a cross-sectional view of a substrate in some embodiments.
Figure 15:
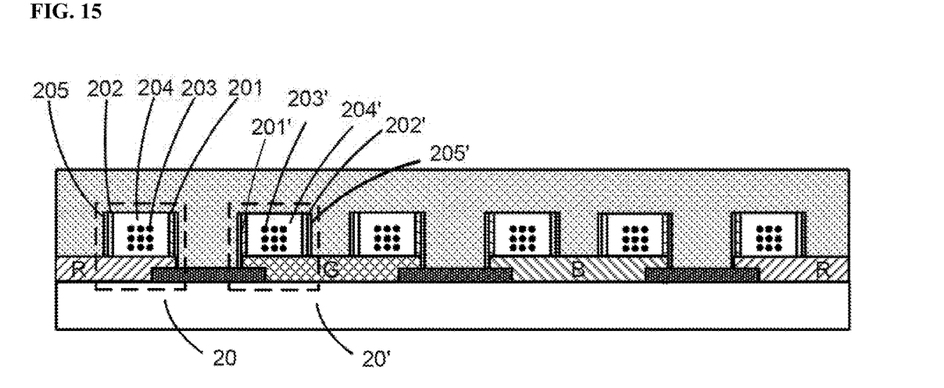
FIG. 15 is a cross-sectional view of a substrate in some embodiments.

Optionally, the first electrode 201 and the second electrode 202 are planar electrodes, the principal planes of which are substantially perpendicular to that of the first color sub-pixel (FIGS. 14-15). Optionally, the first electrode 201 and the second electrode 202 are planar electrodes, the principal planes of which are substantially parallel to that of the first color sub-pixel (FIG. 16).

In some embodiments, the black matrix 11 overlaps with the first color sub-pixel over a first width on the first side of the black matrix 11, and overlaps with the second color sub-pixel over a second width on the second side of the black matrix 11. Optionally, the first width and the second width are substantially the same. Optionally, the second width is larger than the first width (see, e.g., FIG. 14).

Figure 16:
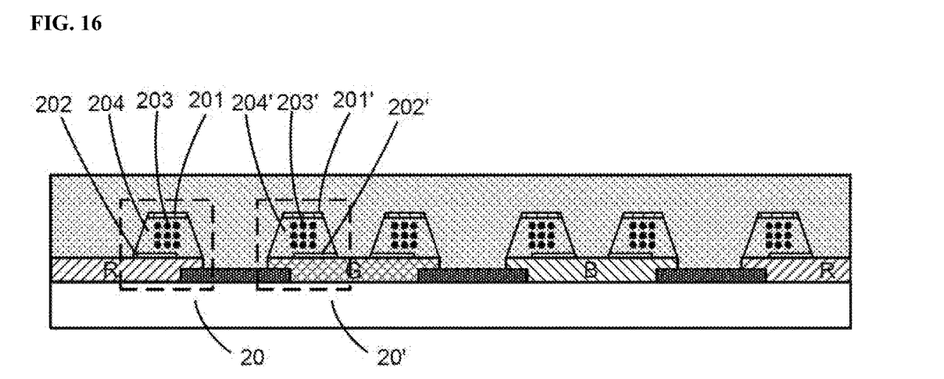
FIG. 16 is a cross-sectional view of a substrate in some embodiments.

In some embodiments, as exemplified in FIGS. 15 and 16, the substrate further includes a second electrophoresis cell 20'. A projection of the second electrophoresis cell 20' is substantially within a projection of the second color sub-pixel on the base substrate. The second electrophoresis cell 20' includes the third electrode 201' and the fourth electrode 202' (FIGS. 15-16).

Optionally, the third electrode 201' and the fourth electrode 202' are planar electrodes. Optionally, the principal planes of which are substantially perpendicular to that of the second color sub-pixel (FIG. 15). Optionally, the principal planes of which are substantially parallel to that of the second color sub-pixel.

In some embodiments, the substrate further includes a planar layer 21 on a side distal to the base substrate 10 of the black matrix layer, the color film layer, and the plurality of electrophoresis cells 20, sealing the plurality of electrophoresis cells 20. Optionally, the first electrode 201, the second electrode 202, the third electrode 201', and the fourth electrode 202' are planar electrodes, the principal planes of which are substantially parallel to that of the planar layer 21. Optionally, as exemplified in FIG. 16, the first electrode 201 is on a surface of the first color sub-pixel distal to the base substrate 10, and the third electrode 201' is on a surface of the second color sub-pixel distal to the base substrate 10. Optionally, as exemplified in FIG. 16, the second electrode 202 and the fourth electrode 202' are on a surface of the planar layer 21 proximal to the base substrate 10.

Figure 3:
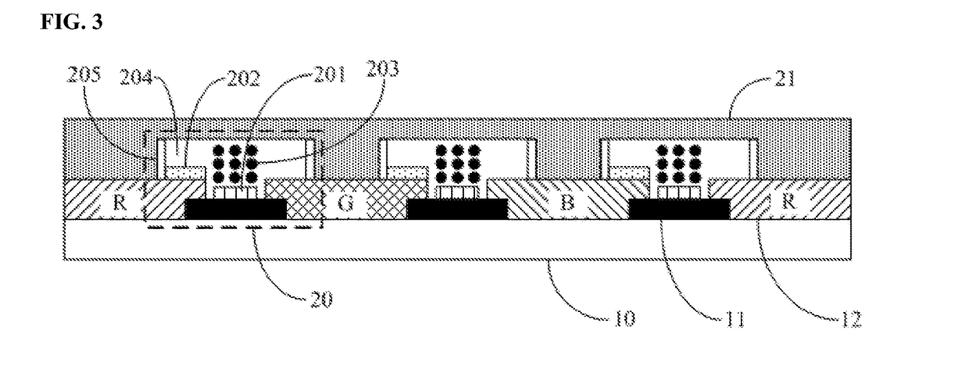
FIG. 3 is a cross-sectional view of a substrate in some embodiments.

FIG. 3 is a cross-sectional view of a substrate in another embodiment. The exemplary substrate in FIG. 3 is a color filter substrate in a liquid crystal display panel. As discussed above, the present disclosure is not limited to liquid crystal display panels nor color filter substrates, but can be any suitable types of display panels and substrates. Referring to FIG. 3, the first electrode 201 in the embodiment is disposed in an area corresponding to the black matrix 11 between two neighboring color sub-pixels. The second electrode 202 is disposed in an area corresponding to only one of the two neighboring color sub-pixels. In FIG. 3, the second electrode 202 is disposed in an area corresponding to the neighboring color sub-pixel on the left side of the black matrix 11. Optionally, all second electrodes 202 in all electrophoresis cells 20 can be disposed in the areas corresponding to the color sub-pixels on a same side of the black matrixes 11, e.g., on the left side (FIG. 3) or on the right side. Optionally, some second electrodes 202 are disposed in the areas corresponding to the color sub-pixels on a first side (e.g., left side) of the black matrixes 11, and some other second electrodes 202 are disposed in the areas corresponding to the color sub-pixels on a second side (e.g., right side) of the black matrixes.

In some embodiments, the second electrode 202 is on only one side of the one of the plurality of black matrixes 11, the projection of the second electrode 202 on the base substrate 10 is at least partially outside of the projection of the one of the plurality of black matrixes 11 on the base substrate 10 (FIG. 3). In some embodiments, the second electrode 202 includes a first sub-electrode and a second sub-electrode. The first sub-electrode is on a first side of the one of the plurality of black matrixes 11. The second sub-electrode is on a second side of the one of the plurality of black matrixes 11. The projection of the first sub-electrode on the base substrate 10 is at least partially outside of the projection of the one of the plurality of black matrixes 11 on the base substrate 10. The projection of the second sub-electrode on the base substrate 10 is at least partially outside of the projection of the one of the plurality of black matrixes 11 on the base substrate 10 (FIG. 2).

In some embodiments, all second electrodes 202 in all electrophoresis cells 20 have a same width along a direction, e.g., the horizontal direction in FIG. 3. Optionally, the widths of the second electrodes 202 are designed to vary in different regions of the substrate. Optionally, the widths of the second electrodes 202 gradually decrease or gradually increase along a predetermined direction. Optionally, the second electrodes 202 in some electrophoresis cells 20 have a first width, and the second electrodes 202 in some other electrophoresis cells 20 have a second width.

Optionally, the first electrode 201 is a non-transparent electrode, and the second electrode 202 is a transparent electrode. Optionally, the first electrode 201 is a transparent electrode, and the second electrode 202 is a non-transparent electrode. Optionally, both the first electrode 201 and the second electrode 202 are transparent electrodes. Suitable materials for making a non-transparent electrode include, but are not limited to, conductive metals. Suitable materials for making a transparent electrode include, but are not limited to, a single layer indium tin oxide, a single layer indium zinc oxide, and a double layer having indium tin oxide and indium zinc oxide. When both electrodes are transparent electrodes, they may be formed in a single patterning process.

Figure 4:
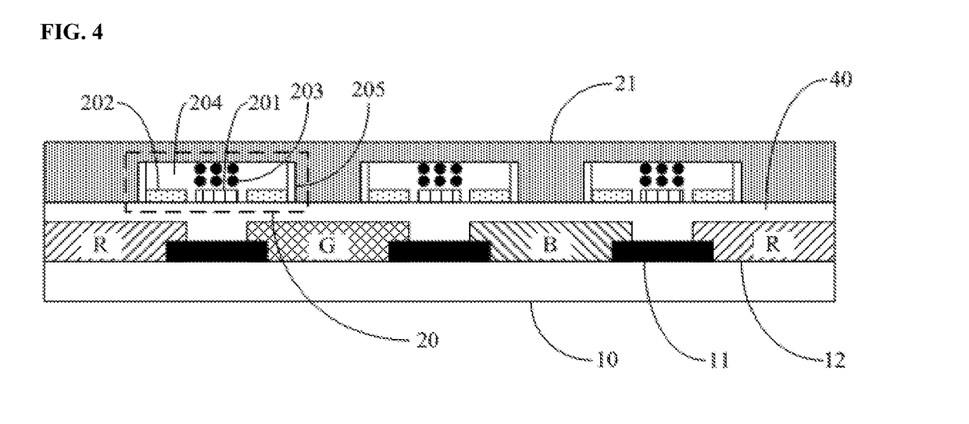
FIG. 4 is a cross-sectional view of a substrate in some embodiments.

In some embodiments, the substrate further includes a protective layer 40 on a side of the black matrix layer 11 distal to the base substrate 10 (see FIG. 4). Optionally, in display panels having a color film layer 12, the protective layer 40 is disposed on a side distal to the base substrate 10 of the black matrix 11 and the color film layer 12. The electrophoresis cells 40 can be disposed on a side of the protective layer 40 distal to the base substrate 10, which protects the black matrix layer 11 and the color film layer 12 from any potential corrosion caused by external environment, e.g., the electrophoresis media 204. With the addition of the protective layer 40, the first electrode 201 and the second electrode 202 can be disposed on a same level, facilitating an efficient fabricating process. Optionally, the first electrode and the second electrode are substantially on a same plane with respect to each other. Optionally, the principal planes of the first electrode 201 and the second electrode 202 are substantially parallel to the protective layer 40.

Figure 5:
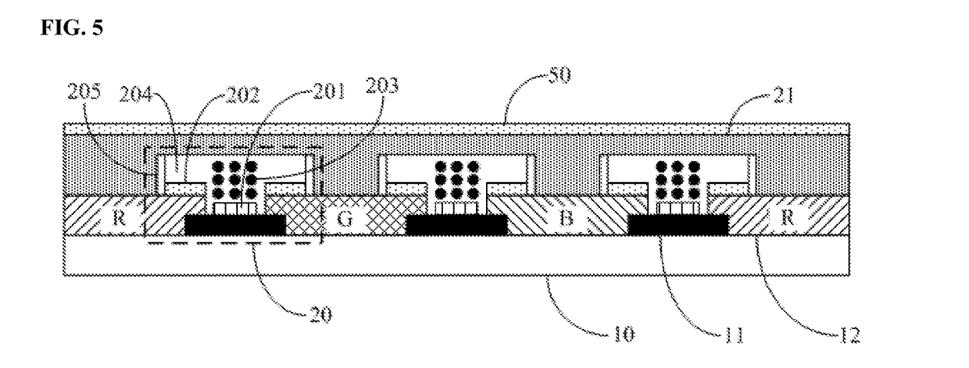
FIG. 5 is a cross-sectional view of a substrate having a transparent electrode layer in some embodiments.

In some embodiments, the substrate further includes a transparent electrode layer 50 on a side of the planar layer 21 distal to the base substrate 10 (FIG. 5). The transparent layer 50 is connected to ground, forming a shielding layer.

Optionally, the substrate in the embodiment as shown in FIG. 5 is a substrate in a Twisted Nematic (TN) display panel.

Figure 6A:
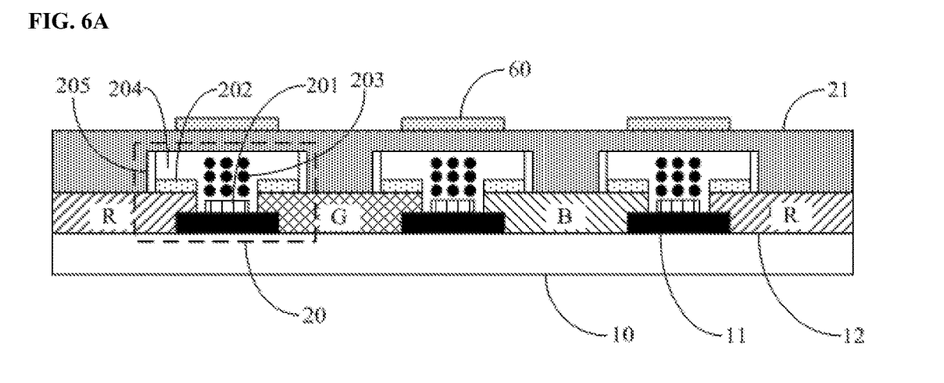
FIGS. 6A and 6B are cross-sectional views of substrates having a shielding electrode layer in some embodiments.
Figure 6B:
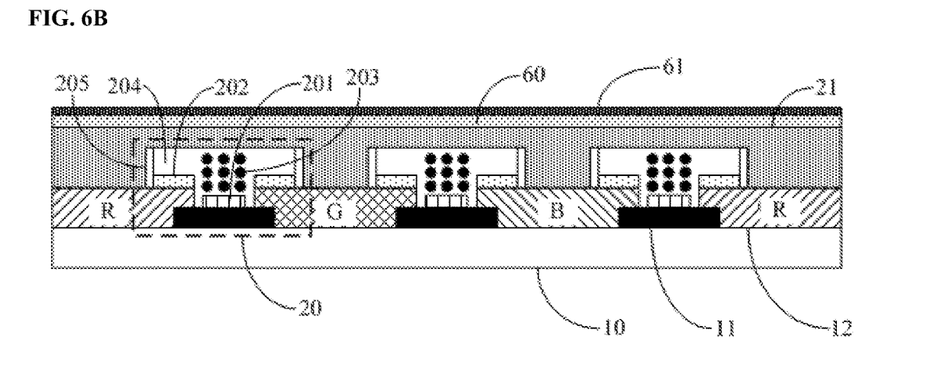

In some embodiments, the substrate further includes a shielding electrode layer 60 on a side of the planar layer 21 distal to the base substrate 10 (FIGS. 6A and 6B). The shielding electrode layer 60 is connected to ground, forming a shielding layer. Optionally, the substrate in the embodiment as shown in FIG. 6A is a substrate in an Advanced Super Dimension Switch (ADS) display panel. The shielding electrode layer 60 can be either a transparent conductive layer or a metal layer. When the shielding electrode layer 60 is a transparent conductive layer, the shielding electrode layer 60 can be on a side distal to the base substrate 10 of the planar layer 21 and covers the planar layer 21. When the shielding electrode layer 60 is a metal layer, the shielding electrode layer 60 is on a side of the planar layer 21 distal to the base substrate 10 in areas corresponding to the black matrix layer 11. When the shielding electrode layer 60 is on a side of the planar layer 21 distal to the base substrate 10 in areas corresponding to the black matrix layer 11, the crosstalk between the electric field of the liquid crystal layer and the electric field of the electrophoresis cell 20 can be prevented. At the same time, the turbulence field formed between the shielding electrode layer 60 and the gate/data lines on the array substrate can be shielded by the black matrix 11 because the shielding electrode layer 60 is disposed in areas corresponding to the black matrix layer 11.

In some embodiments, the shielding electrode layer 60 is disposed on a side of the planar layer 21 distal to the base substrate 10, and covers the planar layer 21. In doing so, the fabricating process for forming the shielding electrode layer 60 in an ADS display panel can be simplified. When the shielding electrode layer 60 can be disposed on a side of the planar layer 21 distal to the base substrate 10, the crosstalk between the electric field of the liquid crystal layer and the electric field of the electrophoresis cell 20 can be prevented.

In some embodiment, the substrate further includes a transparent high resistivity layer 61 on a side of the shielding electrode layer 60 distal to the base substrate 10 (see FIG. 6b) for preventing interference of the electric field of the liquid crystal layer by the shielding electrode layer 60. Optionally, the transparent high resistivity layer 61 has a resistance in the range of $10^{13}\Omega$ to $10^{14}\Omega$.

In some embodiments, the substrate further includes a first signal wire connected to the first electrode 201 and a second signal wire connected to the second electrode 202. Optionally, the first electrode 201 is connected to ground through the first signal wire, and the second electrode 202 is connected to the second signal line for receiving a positive voltage signal or a negative voltage signal. Optionally, the second electrode 202 is connected to ground through the second signal wire, and the first electrode 201 is connected to the first signal line for receiving a positive voltage signal or a negative voltage signal.

Figure 7:
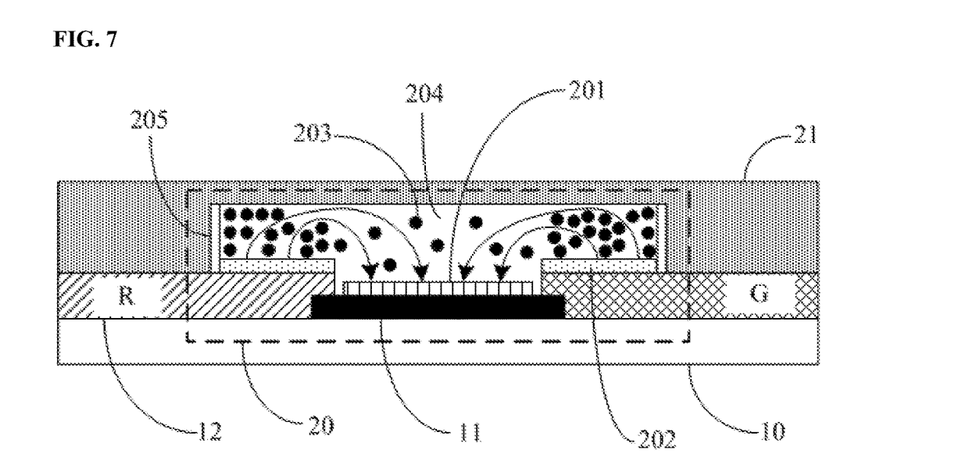
FIG. 7 is a diagram illustrating the working principle of an electrophoresis cell in some embodiments.

FIG. 7 is a diagram illustrating the working principle of an electrophoresis cell in an embodiment. Referring to FIG. 7, the first electrode 201 in the embodiment is connected to ground through the first signal wire, and the second electrode 202 in the embodiment is connected to the second signal line for receiving a positive voltage signal or a negative voltage signal. The charged particle 203 in the embodiment is a negatively charged, non-transparent, metal chelated black-20 charged particle. When the second electrode 202 receives a positive voltage signal, the electric field between the first electrode 201 and the second electrode 202 is illustrated as arrows in FIG. 7. The metal chelated black-20 particle is negatively charged, it migrates toward a direction which is reverse of the direction of the electric field, i.e., it migrates towards the second electrode 202 through the electrophoresis media 204, and accumulates around the second electrode 202. As a result, the total light shielding area of the substrate is increased because the charged particles are non-transparent. When the second electrode 202 receives a negative voltage signal, the electric field between the first electrode 201 and the second electrode 202 is reverse of that illustrated in FIG. 7, i.e., the electric field has a direction which is from the first electrode 201 to the second electrode 202. The metal chelated black-20 particle is negatively charged, it migrates toward a direction which is reverse of the direction of the electric field, i.e., it migrates towards the first electrode 201 through the electrophoresis media 204, and accumulates around the first electrode 201. As a result, the total light shielding area of the substrate is unchanged (e.g., same as the light shielding area provided by the black matrix 11) because the charged particles are non-transparent.

Optionally, when the display panel is in a flat display panel mode, the second electrode 202 receives a negative voltage signal so that the total light shielding area of the substrate is unchanged. Optionally, when the display panel is in a flexible display panel mode, the second electrode 202 receives a positive voltage signal so that the total light shielding area of the substrate is increased.

In some embodiments, the migration of the charge particles 203 results in a positional shift of the light shielding area in the substrate. Optionally, the positional shift also changes the total light shielding area of the substrate. Optionally, the positional shift does not result in changing the total light shielding area of the substrate. For example, when the display panel is in a flat display panel mode, the charged particles 203 (e.g., non-transparent particles) accumulate in the second area but only around one side (e.g., left side) of the black matrix 11. When the display panel is in a flexible display panel mode, the charged particles 203 accumulate in the second area around a different side (e.g., right side) of the black matrix 11.

Referring to FIG. 7, when the display panel is in a flat display panel mode, the second electrode 202 on a R sub-pixel receives a positive voltage signal, and the second electrode 202 on the G sub-pixel receives a negative voltage signal or does not receive a voltage signal. The non-transparent charged particles 203 accumulate on the left side of the black matrix 11, forming a first total light shielding area with the black matrix 11. When the display panel is in a flexible display panel mode (or other modes) and light leakage occurs, e.g., around the other side of the black matrix 11, the second electrode 202 on the R sub-pixel receives a negative voltage signal or does not receive a voltage signal. The second electrode 202 on the G sub-pixel receives a positive voltage signal. The non-transparent charged articles 203 now migrate toward the right side of the black matrix 11 in response to the voltage signal. The charged particles 203 accumulate on the right side of the black matrix 11. Consequently, the light shielding area of the substrate has a positional shift. Optionally, the positional shift of the light shielding area is not accompanied by a change in the total light shielding area of the substrate. Optionally, not only the position of the light shielding are but also the total light shielding area are changed in response to different voltage difference between two second electrodes 202 on the R sub-pixel and the G sub-pixel.

Figure 8:
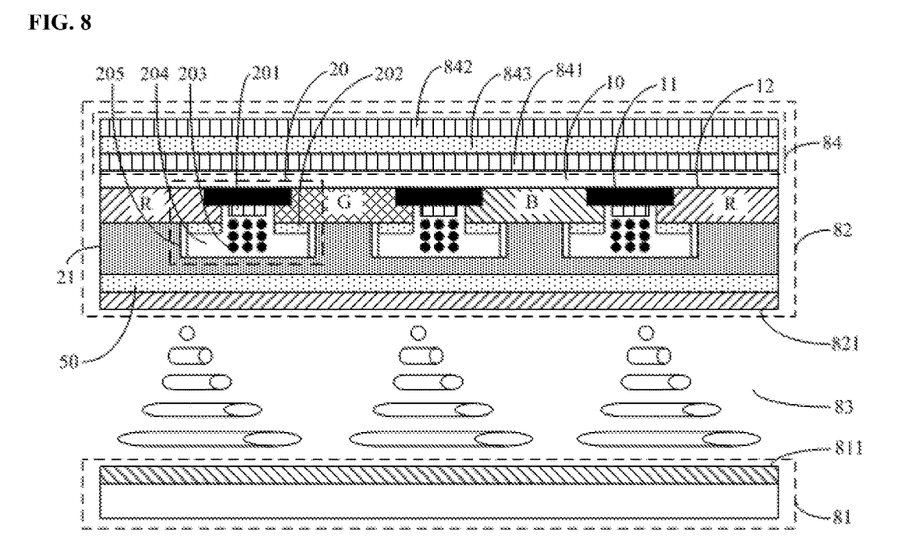
FIG. 8 is a cross-sectional view of a display panel in some embodiments.
Figure 9:
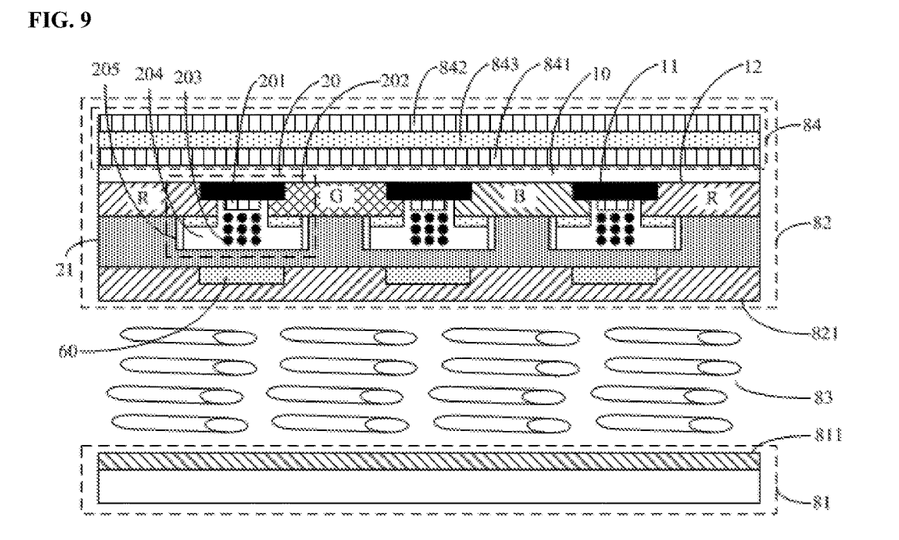
FIG. 9 is a cross-sectional view of a display panel in some embodiments.

FIG. 8 is a cross-sectional view of a display panel in an embodiment. FIG. 9 is a cross-sectional view of a display panel in another embodiment. Referring to FIGS. 8 and 9, the display panel in the embodiment includes an array substrate 81, a color filter substrate 82, and a liquid crystal layer 82 disposed in-between. The array substrate includes a first liquid crystal alignment layer 811, the color filter substrate includes a second liquid crystal alignment layer 821. The first liquid crystal alignment layer 811 and the second liquid crystal alignment layer 821 align the liquid crystal molecules in the liquid crystal layer 83. The display panel in FIG. 8 is a TN type display panel and the display panel in FIG. 9 is an ADS type display panel.

In some embodiments, the display panel further includes a deformation detecting layer 84 disposed on a side of the substrate 82 distal to the array substrate 81, or a side of the array substrate 81 distal to the substrate 82. In FIGS. 8 and 9, the deformation detection layer 84 is disposed on a side of the substrate 82 distal to the array substrate 81.

In some embodiments, the deformation detecting layer 84 includes a first transparent electrode layer 841, a second transparent electrode layer 842, and anionic groups-containing polymer layer 843 disposed between the first transparent electrode layer 841 and the second transparent electrode layer 842.

When the display panel is bent, the polymer layer 843 is pressed, and generates a deformation voltage signal. The first transparent electrode layer 841 and the second transparent electrode layer 842 transmit the deformation voltage signal to an external circuit. The deformation voltage signal is amplified by the external circuit. The amplified deformation voltage signal is then transmitted to a control integrated circuit which is connected to the external circuit and the electrophoresis cells 20. The control integrated circuit controls the electrophoresis cells 20, thereby changing a total light shielding area of the substrate 82 or changing the position of a light shielding area of the substrate 82. The polymer for making the ionic groups-containing polymer layer 843 can be any suitable polymers, e.g., polyethylene or polypropylene.

Figure 10:
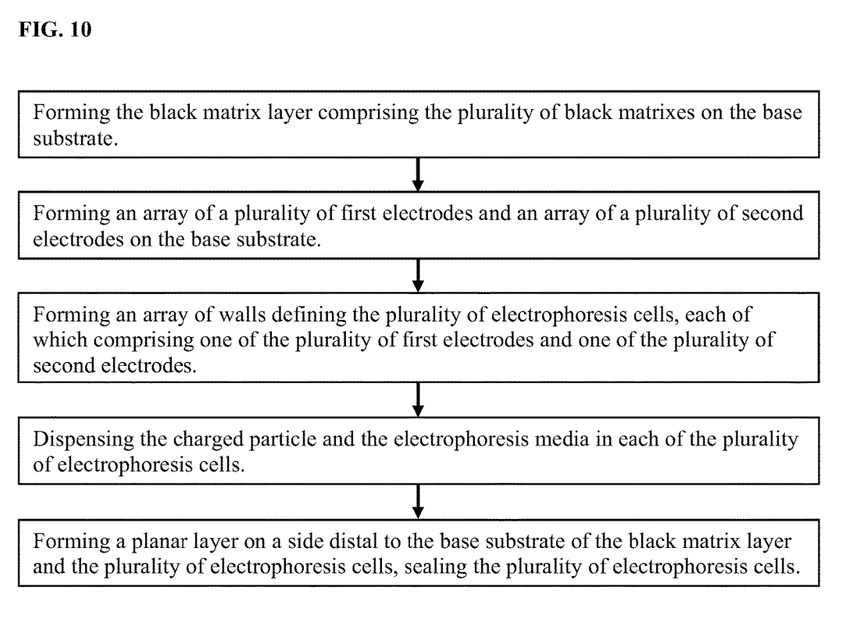
FIG. 10 a flow chart illustrating a method of fabricating a substrate in some embodiments.

FIG. 10 a flow chart illustrating a fabricating method of a substrate in an embodiment. Referring to FIG. 10, the method in the embodiment includes forming the black matrix layer comprising the plurality of black matrixes on the base substrate; forming an array of a plurality of first electrodes and an array of a plurality of second electrodes on the base substrate; forming an array of walls defining the plurality of electrophoresis cells, each of which comprising one of the plurality of first electrodes and one of the plurality of second electrodes; dispensing the charged particle and the electrophoresis media in each of the plurality of electrophoresis cells; and forming a planar layer on the base substrate sealing the plurality of electrophoresis cells. As discussed above, the charged particle can migrate toward and accumulate around the first region in response to a first voltage difference between the first electrode and the second electrode, and migrates toward and accumulates around the second region in response to a second voltage difference between the first electrode and the second electrode, thereby changing a total light shielding area of the substrate or changing the position of a light shielding area of the substrate.

Optionally, the method further includes forming a color film layer on the base substrate. Optionally, the step of forming the planar layer includes forming a first planar layer having a higher density on the base substrate; curing the first planar layer by light; forming a second planar layer having a lower density on the base substrate; and curing the second planar layer by heat.

Optionally, any the above steps can be formed by a patterning process. For example, the array of a plurality of first electrodes and an array of a plurality of second electrodes can be formed by first depositing a transparent conductive layer on the base substrate, followed by patterning the transparent conductive layer to form the array of the plurality of first electrodes and the array of the plurality of second electrodes. The array of walls can be formed by, for example, coating the base substrate with a transparent polymer layer or a transparent resin layer, followed by patterning the transparent polymer layer or the transparent resin layer to form the array of walls. Optionally, the walls can be formed using a same material as the planar layer, as discussed above.

Taking the substrate in FIG. 2 as an example, the method in some embodiments includes forming a black matrix layer having a plurality of black matrixes and a color film layer having an array of color sub-pixels on the base substrate. Next, the method in the embodiment includes depositing a transparent conductive layer on the base substrate, and patterning the transparent conductive layer to form an array of a plurality of first electrodes and an array of a plurality of second electrodes. Optionally, the transparent conductive layer is made of indium tin oxide. Specifically, a layer of indium tin oxide is deposited on the base substrate by magnetron sputtering or evaporation coating. A photoresist is then formed on the deposited indium tin oxide layer and a mask having a predetermined pattern is placed on the photoresist layer, followed by UV exposure, development, baking and etching, thereby forming the array of a plurality of first electrodes and the array of a plurality of second electrodes.

The method in the embodiment also includes coating the base substrate having the black matrix 11, color film layer, and the first and second electrodes with a transparent polymer layer or a transparent resin layer, followed by patterning the transparent polymer layer or the transparent resin layer to form a plurality of transparent walls. Specifically, the transparent polymer layer or the transparent resin layer is a photoresist polymer layer or a photoresist resin layer. A mask having a predetermined wall pattern is placed on the polymer layer or the resin layer, followed by UV exposure, development, baking and etching, thereby forming the array of walls, which define a plurality of electrophoresis cells. Each of the electrophoresis cells contains a first electrode and a second electrode.

The method in the embodiment further includes dispensing a non-transparent charged particle and a transparent electrophoresis media in each electrophoresis cell defined by a wall. The electrophoresis media is evenly distributed over the area defined by the walls. The charged particles and the electrophoresis media are pre-mixed in a certain ratio prior to the dispensing step. For example, the mixture can be heated and/or mixed by ultrasound. To achieve optimal results in dispensing the mixture, parameters such as temperature, electrostatic charges, humidity can be controlled and/or adjusted.

A planar layer is then formed on a side of the electrophoresis cells distal to the base substrate. In the specific example as shown in FIG. 2, the planar layer covers the entire area of the base substrate, and seals the electrophoresis cells. The planar layer can be made of any suitable materials, e.g., silicon nitride and silicon oxide.

In some embodiments, the planar layer includes a first planar layer and a second planar layer. The first planar layer has higher density as compared to the second planar layer. Optionally, the method of forming the planar layer may include forming the first planar layer by ink-jet printing. During leveling, the first planar layer seals the electrophoresis cells. To stabilize the first planar layer, the first planar layer is cured by light. A planar layer having higher density can better seal the electrophoresis cells.

A second planar layer having relatively lower density is then formed on a side of the first planar layer distal to the base substrate. To stabilize the second planar layer, the second planar layer is cured by heat. The second planar layer has a low density, thus can achieve a better planarization effect as compared to the first planar layer. By adopting a second planar layer, the surface flatness of the substrate.

The present disclosure further provides a display apparatus having a display panel or a substrate described herein, or a display panel or a substrate manufactured by a method described herein. The display apparatus can be of any suitable type, for example, a liquid crystal display panel, a liquid crystal display apparatus, a liquid crystal television, an organic light emitting diode (OLED) display panel, an OLED display apparatus, an OLED television, an electronic paper, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second". etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A substrate, comprising:
    a base substrate;
    a black matrix layer comprising an array of a plurality of black matrixes on a first side of the base substrate; and
    a plurality of electrophoresis cells on the first side of the base substrate, each of the plurality of electrophoresis cells comprises a first electrode, a second electrode, a mixture of an electrophoresis media and charged particles, wherein the charged particles are movable in response to an electrical signal.

2. The substrate of claim 1, wherein the first electrode and the second electrode are planar electrodes; and principal planes of the first electrode and the second electrode are substantially perpendicular to a principal plane of the one of the plurality of black matrixes.

3. The substrate of claim 1, wherein the first electrode and the second electrode are planar electrodes; and principal planes of the first electrode and the second electrode are substantially parallel to a principal plane of the one of the plurality of black matrixes.

4. The substrate of claim 1, wherein a projection of the first electrode on the base substrate is at least partially within a projection of one of the plurality of black matrixes on the base substrate; and a projection of the second electrode on the base substrate is at least partially outside of the projection of the one of the plurality of black matrixes on the base substrate.

5. The substrate of claim 4, wherein the projection of the first electrode on the base substrate is within the projection of the one of the plurality of black matrixes on the base substrate, and the projection of the second electrode on the base substrate is outside the projection of the one of the plurality of black matrixes on the base substrate.

6. The substrate of claim 4, wherein the second electrode is on only one side of the one of the plurality of black matrixes, the projection of the second electrode on the base substrate is at least partially outside of the projection of the one of the plurality of black matrixes on the base substrate.

7. The substrate of claim 4, wherein the second electrode comprises a first sub-electrode and a second sub-electrode, the first sub-electrode is on a first side of the one of the plurality of black matrixes, the second sub-electrode is on a second side of the one of the plurality of black matrixes, the projection of the first sub-electrode on the base substrate is at least partially outside of the projection of the one of the plurality of black matrixes on the base substrate, and the projection of the second sub-electrode on the base substrate is at least partially outside of the projection of the one of the plurality of black matrixes on the base substrate.

8. The substrate of claim 1, wherein a projection of the first electrode on the base substrate is at least partially outside of a projection of one of the plurality of black matrixes on the base substrate, a projection of the second electrode on the base substrate is at least partially outside of the projection of the one of the plurality of black matrixes on the base substrate, the first electrode is on a first side of the one of the plurality of black matrixes, and the second electrode is on a second side of the one of the plurality of black matrixes.

9. The substrate of claim 8, wherein the projection of the first electrode on the base substrate is outside of the projection of the one of the plurality of black matrixes on the base substrate, the projection of the second electrode on the base substrate is outside of the projection of the one of the plurality of black matrixes on the base substrate.

10. The substrate of claim 1, further comprising a color film layer comprising an array of a plurality of color sub-pixels on the first side of the base substrate, wherein
    a projection of the first electrode on the base substrate is at least partially within a projection of one of the plurality of black matrixes on the base substrate; and
    a projection of the second electrode is at least partially within a projection of one of the plurality of color sub-pixels on the base substrate.

11. The substrate of claim 10, wherein one of the plurality of black matrixes is proximal to a first color sub-pixel on a first side of the one of the plurality of black matrixes and a second color sub-pixel on a second side of the one of the plurality of black matrixes, a projection of a first one of the plurality of electrophoresis cells is substantially within a projection of the first color sub-pixel on the base substrate, the first one of the plurality of electrophoresis cells comprises the first electrode and the second electrode.

12. The substrate of claim 11, wherein the one of the plurality of black matrixes overlaps with the first color sub-pixel over a first width on the first side and overlaps with the second color sub-pixel over a second width on the second side, the second width is larger than the first width.

13. The substrate of claim 11, wherein a projection of a second one of the plurality of electrophoresis cells is substantially within a projection of the second color sub-pixel on the base substrate, the second one of the plurality of electrophoresis cells comprises a third electrode and a fourth electrode.

14. The substrate of claim 13, further comprising a planar layer on a side distal to the base substrate of the black matrix layer, the color film layer, and the plurality of electrophoresis cells, sealing the plurality of electrophoresis cells;
the first electrode, the second electrode, the third electrode, and the fourth electrode are planar electrodes; principal planes of the first electrode, the second electrode, the third electrode, and the fourth electrode are substantially parallel to a principal plane of the planar layer;
the first electrode is on a surface of the first color sub-pixel distal to the base substrate, and the third electrode is on a surface of the second color sub-pixel distal to the base substrate; and
the second electrode and the fourth electrode are on a surface of the planar layer proximal to the base substrate.

15. The substrate of claim 10, further comprising a protective layer on a side distal to the base substrate of the black matrix layer and the color film layer; and
wherein the plurality of electrophoresis cells are on a side of the protective layer distal to the base substrate.

16. The substrate of claim 1, further comprising a planar layer on a side distal to the base substrate of the black matrix layer, and the plurality of electrophoresis cells, sealing the plurality of electrophoresis cells.

17. The substrate of claim 16, wherein a projection of the first electrode on the base substrate is at least partially within a projection of one of the plurality of black matrixes on the base substrate; a projection of the second electrode on the base substrate is at least partially outside of the projection of the one of the plurality of black matrixes on the base substrate; and the first electrode is on a surface of the planar layer proximal to the base substrate.

18. The substrate of claim 1, further comprising a deformation detecting layer disposed on a second side of the substrate;
wherein the deformation detecting layer comprises a first transparent electrode layer, a second transparent electrode layer, and a polymer layer containing ionic groups;
the polymer layer generates a deformation voltage signal when the polymer layer is pressed; and
the first transparent electrode layer and the second transparent electrode layer transmit the deformation voltage signal to an external circuit.

19. A display panel comprising an array substrate and a substrate of claim 1.

20. A method of fabricating a substrate of claim 1, comprising:
forming the black matrix layer comprising the plurality of black matrixes on the base substrate;
forming an array of a plurality of first electrodes and an array of a plurality of second electrodes on the base substrate;
forming an array of walls defining the plurality of electrophoresis cells, each of which comprising one of the plurality of first electrodes and one of the plurality of second electrodes;
dispensing the charged particles and the electrophoresis media in each of the plurality of electrophoresis cells; and
forming a planar layer on a side distal to the base substrate of the black matrix layer and the plurality of electrophoresis cells, sealing the plurality of electrophoresis cells.

* * * * *